United States Patent
Lee et al.

(10) Patent No.: US 11,537,514 B2
(45) Date of Patent: Dec. 27, 2022

(54) DATA STORAGE DEVICE AND OPERATING METHOD THEREOF

(71) Applicant: SK hynix Inc., Gyeonggi-do (KR)

(72) Inventors: Joo Young Lee, Seoul (KR); Sung Kwan Hong, Seoul (KR)

(73) Assignee: SK hynix Inc., Gyeonggi-do (KR)

(*) Notice: Subject to any disclaimer, the term of this patent is extended or adjusted under 35 U.S.C. 154(b) by 543 days.

(21) Appl. No.: 16/276,424

(22) Filed: Feb. 14, 2019

(65) Prior Publication Data

US 2019/0266083 A1 Aug. 29, 2019

(30) Foreign Application Priority Data

Feb. 27, 2018 (KR) .................. 10-2018-0023690
Feb. 1, 2019 (KR) .................. 10-2019-0013309

(51) Int. Cl.
G06F 12/02 (2006.01)
G06F 11/30 (2006.01)
G06F 12/1009 (2016.01)

(52) U.S. Cl.
CPC ...... *G06F 12/0253* (2013.01); *G06F 11/3034* (2013.01); *G06F 12/1009* (2013.01); *G06F 2201/88* (2013.01); *G06F 2212/7201* (2013.01); *G06F 2212/7205* (2013.01)

(58) Field of Classification Search
CPC ............ G06F 11/3034; G06F 12/0246; G06F 12/0253; G06F 12/1009; G06F 2201/88; G06F 2212/1036; G06F 2212/7201; G06F 2212/7205

See application file for complete search history.

(56) References Cited

U.S. PATENT DOCUMENTS

2016/0231953 A1* 8/2016 Lee ............ G06F 3/0619
2017/0322747 A1* 11/2017 Kumano .......... G06F 3/0659

FOREIGN PATENT DOCUMENTS

KR 1020170073794 6/2017

* cited by examiner

*Primary Examiner* — Yong J Choe
(74) *Attorney, Agent, or Firm* — IP & T Group LLP (57) ABSTRACT

A controller for controlling a nonvolatile memory device comprising: a read count table including a plurality of read count data, wherein each of the read count data includes a read count value for one data storage region; a read count address table including a read count address indicating an address of a memory region where the read count data is stored; a flash translation layer (FTL) configured to control an operation of the nonvolatile memory device, and manage the read count table and the read count address table; and a flash interface layer (FIL) configured to control data communication between the FTL and the nonvolatile memory device, and update the read count value based on the read count address when read operation is performed on the data storage region.

13 Claims, 8 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean application number 10-2018-0023690, filed on Feb. 27, 2018 and Korean application number 10-2019-0013309, filed on Feb. 1, 2019 in the Korean Intellectual Property Office, which are incorporated herein by reference in its entirety.

BACKGROUND

1. Technical Field

Various embodiments of the present disclosure generally relate to a semiconductor device. Particularly, the embodiments relate to a data storage device and an operating method thereof.

2. Related Art

In general, a memory device may be classified into a volatile memory which loses data stored therein when power supply is interrupted, and a nonvolatile memory which retains data stored therein even when power supply is interrupted. A data processing system including such a memory device requires a controller for controlling the memory device according to a request such as a write, read or erase request from an external host device. Furthermore, due to the physical characteristics of memory cells in which data are stored, the memory device is limited in the number of operations such as write operation for storing data, a read operation for reading stored data, and an erase operation for erasing stored data. Such a limit is referred to as the endurance of the memory device. In a round-robin journaling method, when a safe shutdown occurs after booting of a memory system, a part of a logical block addressing (LBA) mapping table may be changed to flush the entire LBA mapping table. In this case, since the E/W count of the memory device is increased, the endurance of the memory device may be affected.

SUMMARY

Various embodiments are directed to a data storage device capable of maintaining independence between a flash translation layer (FTL) and a flash interface layer (FIL).

In an embodiment of the present disclosure, A controller for controlling a nonvolatile memory device, comprising: a read count table including a plurality of read count data, wherein each of the read count data includes a read count value for one data storage region; a read count address table including a read count address indicating an address of a memory region where the read count data is stored; a flash translation layer (FTL) configured to control an operation of the nonvolatile memory device, and manage the read count table and the read count address table; and a flash interface layer (FIL) configured to control data communication between the FTL and the nonvolatile memory device, and update the read count value based on the read count address when read operation is performed on the data storage region.

In an embodiment of the present disclosure, there is provided An operating method of a controller which includes an FTL and an FIL to control an operation of a nonvolatile memory device, the operating method comprising: requesting, by the FIL, a read count address to the FTL, the read count address indicating an address of a memory region in which read count data including a read count value of a data storage region on which a read operation has been performed, among a plurality of data storage regions included in the nonvolatile memory device, is stored; transferring, by the FTL, the read count address to the FIL according to the request of the FIL; and updating, by the FIL, the read count value of the data storage region based on the read count address received from the FTL.

In an embodiment of the present disclosure, there is provided a memory system comprising: a memory device configured to perform a read operation on a read-target region; a memory configured to load a read count table having fields of a read count address, an address of the read-target region and a read count of the read-target region; an interface configured to provide a request including information of the address of the read-target region; and a control logic configured to provide, in response to the request, the interface with information of the read count address corresponding to the information of the address of the read-target region, wherein the interface updates information of the read count of the read-target region corresponding to the information of the read count address, and wherein the control logic controls the memory device to perform a read reclaim operation to the read-target region according to the information of the read count of the read-target region.

DETAILED DESCRIPTION

Various embodiments are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention. It is noted that reference to "an embodiment" does not necessarily mean only one embodiment, and different references to "an embodiment" are not necessarily to the same embodiment (s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Hereinafter, a data storage device and an operating method thereof according to the present disclosure will be described below with reference to the accompanying drawings through various embodiments.

Figure 1:
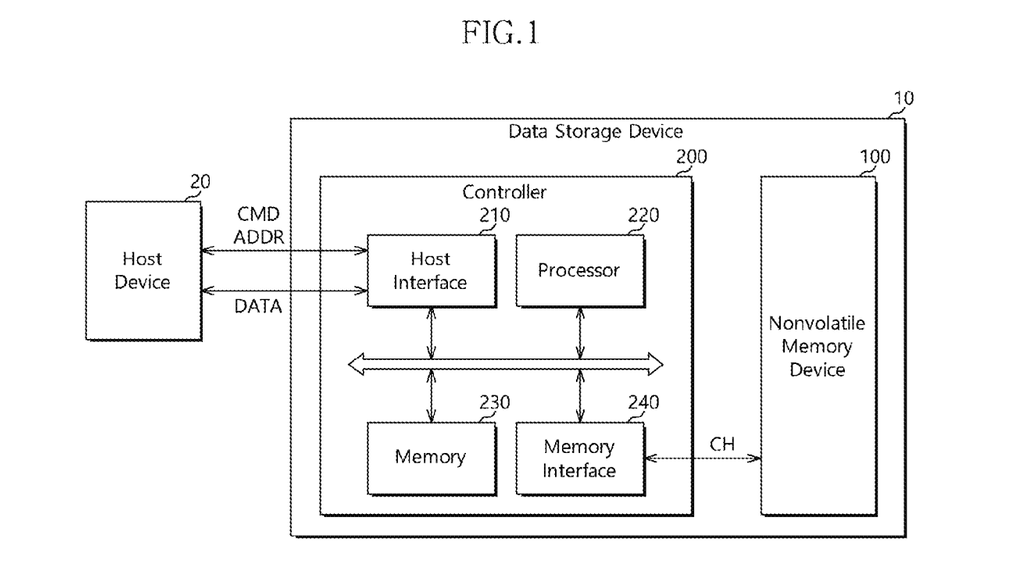
FIG. 1 illustrates a configuration of a data storage device in accordance with an embodiment.

FIG. 1 illustrates a configuration of a data storage device 10 in accordance with an embodiment.

Referring to FIG. 1, the data storage device 10 in accordance with the present embodiment may store data that may be accessed by a host device 20 such as a mobile phone, MP3 player, laptop computer, desktop computer, game machine, TV or in-vehicle infotainment system. The data storage device 10 may be referred to as a memory system.

The data storage device 10 may be fabricated as any one of various types of storage devices, depending on an interface protocol coupled to the host device 20. For example, the data storage device 10 may be configured as any one of various types of storage devices which include a solid state drive (SSD), a multimedia card such as an MMC, eMMC, RS-MMC or micro-MMC, a secure digital card such as an SD, mini-SD or micro-SD, a universal serial bus (USB) storage device, a universal flash storage (UFS) device, a personal computer memory card international association (PCMCIA) card-type storage device, a peripheral component interconnection (PCI) card-type storage device, a PCI express (PCI-E) card-type storage device, a compact flash (CF) card, a smart media card and a memory stick.

The data storage device 10 may be fabricated as any one of various types of packages. For example, the data storage device 10 may be fabricated as any one of various types of packages such as a package-on-package (POP), system-in-package (SIP), system-on-chip (SOC), multi-chip package (MCP), chip-on-board (COB) package, wafer-level fabricated package (WFP) and wafer-level stack package (WSP).

The data storage device 10 may include a nonvolatile memory device 100 and a controller 200.

The nonvolatile memory device 100 may operate as a storage medium of the data storage device 10. The nonvolatile memory device 100 may be configured as any one of various types of nonvolatile memory devices including a NAND flash memory device, a NOR flash memory device, a ferroelectric RAM (FRAM) using a ferroelectric capacitor, a magnetic RAM (MRAM) using a tunneling magneto-resistive (TMR) film, a phase change RAM (PRAM) using chalcogenide alloys, and a resistive RAM (ReRAM) using transition metal oxide, depending on memory cells.

The embodiment of FIG. 1 illustrates that the data storage device 10 includes one nonvolatile memory device 100. However, this is only an example for convenience of description, and the data storage device 10 may include a plurality of nonvolatile memory devices. The present embodiment may be applied in the same manner to a data storage device 10 including a plurality of nonvolatile memory devices.

The nonvolatile memory device 100 may include a memory cell array (not illustrated) having a plurality of memory cells arranged in the respective intersections between a plurality of bit lines (not illustrated) and a plurality of word lines (not illustrated). The memory cell array may include a plurality of memory blocks, and each of the memory blocks may include a plurality of pages.

For example, each of the memory cells of the memory cell array may be a single level cell (SLC) configured to store 1-bit data or a multi-level cell (MLC) configured to store 2 or more-bit data. The MLC may store 2-bit data, 3-bit data, 4-bit data or the like. In general, a memory cell for storing 2-bit data may be referred to as an MLC, a memory cell for storing 3-bit data may be referred to as a triple level cell (TLC), and a memory cell for storing 4-bit data may be referred to as a quadruple level cell (QLC). In the present embodiment, however, the memory cells for storing 2-bit, 3-bit and 4-bit data may be collectively referred to as MLCs, for convenience of description.

A memory cell array 110 may include one or more of the SLC and the MLC. The memory cell array 110 may also include memory cells with a two-dimensional horizontal structure or memory cells with a three-dimensional vertical structure.

The controller 200 may control overall operations of the data storage device 10 by driving firmware or software loaded to a memory 230. The controller 200 may decode and drive a code-based instruction or algorithm such as firmware or software. The controller 200 may be implemented in hardware or as a combination of hardware and software.

The controller 200 may include a host interface 210, a processor 220, the memory 230 and a memory interface 240. Although not illustrated in FIG. 1, the controller 200 may further include an error correction code (ECC) engine which generates parity data by performing ECC encoding on write data provided from a host device, and performs ECC decoding on read data read from the nonvolatile memory device 100 using parity data.

The host interface 210 may interface the host device 20 and the data storage device 10 in response to a protocol of the host device 20. For example, the host interface 210 may communicate with the host device 20 through any one protocol of USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and PCI-E (PCI express).

The processor 220 may include a micro control unit (MCU) and a central processing unit (CPU). The processor 220 may process a request transferred from the host device 20. In order to process the request transferred from the host device 20, the processor 220 may drive a code-based instruction or algorithm, i.e. firmware, which is loaded to the memory 230, and control the nonvolatile memory device 100 and internal function blocks such as the host interface 210, the memory 230 and the memory interface 240.

The processor 220 may generate control signals for controlling an operation of the nonvolatile memory device 100, based on requests transferred from the host device 20, and provide the generated control signals to the nonvolatile memory device 100 through the memory interface 240.

The memory 230 may be configured as a random access memory such as a dynamic RAM (DRAM) or static RAM (SRAM). The memory 230 may store the firmware driven by the processor 220. Furthermore, the memory 230 may data required for driving the firmware, for example, meta data. That is, the memory 230 may operate as a working memory of the processor 220.

The memory 230 may include a data buffer for temporarily storing write data to be transferred to the nonvolatile memory device 100 from the host device 20 or read data to be transferred to the host device 20 from the nonvolatile memory device 100. That is, the memory 230 may operate as a buffer memory.

The memory interface 240 may control data communication between the controller 200 and the nonvolatile memory device 100. Specifically, the memory interface 240 may control the nonvolatile memory device 100 under control of the processor 220. The memory interface 240 may also be referred to as a memory controller. The memory interface 240 may provide control signals to the nonvolatile memory device 100. The control signals may include a command, address and operation control signal for controlling the nonvolatile memory device 100. The memory interface 240 may provide data stored in the data buffer to the nonvolatile memory device 100 or store data transferred from the nonvolatile memory device 100 in the data buffer.

The memory interface 240 may execute a flash interface layer (FIL) which is firmware for controlling data communication between the controller 200 and the nonvolatile memory device 100.

Figure 2:
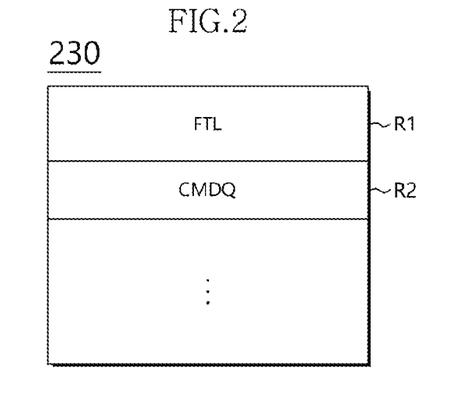
FIG. 2 illustrates a configuration of a memory of FIG. 1.

FIG. 2 illustrates a memory, for example the memory 230 of FIG. 1, in accordance with an embodiment.

Referring to FIG. 2, the memory 230 in accordance with the present embodiment may include a first region R1 in which a flash translation layer (FTL) may be stored, and a second region R2 which may be used as a command queue CMDQ for queuing a command corresponding to a request provided from the host device 20. According to an embodiment, the memory 230 may include regions for various other uses, such as a region used as a write data buffer for temporarily storing write data, a region used as a read data buffer for temporarily storing read data, and a region used as a map cache buffer for caching map data, in addition to the regions illustrated in FIG. 2.

When the nonvolatile memory device 100 is configured as a flash memory device, the processor 220 may control a unique operation of the nonvolatile memory device 100, and drive software referred to as the FTL in order to provide device compatibility to the host device 20. As the H L is driven, the data storage device 10 may be recognized and used as a general data storage device such as a hard disk by the host device 20.

The H L stored in the first region R1 of the memory 230 may include modules for performing various functions and meta data required for driving the respective modules. The FTL may be stored in a system region (not illustrated) of the nonvolatile memory device 100. When the data storage device 10 is powered on, the FTL may be read from the system region of the nonvolatile memory device 100 and loaded to the first region R1 of the memory 230.

Figure 3:
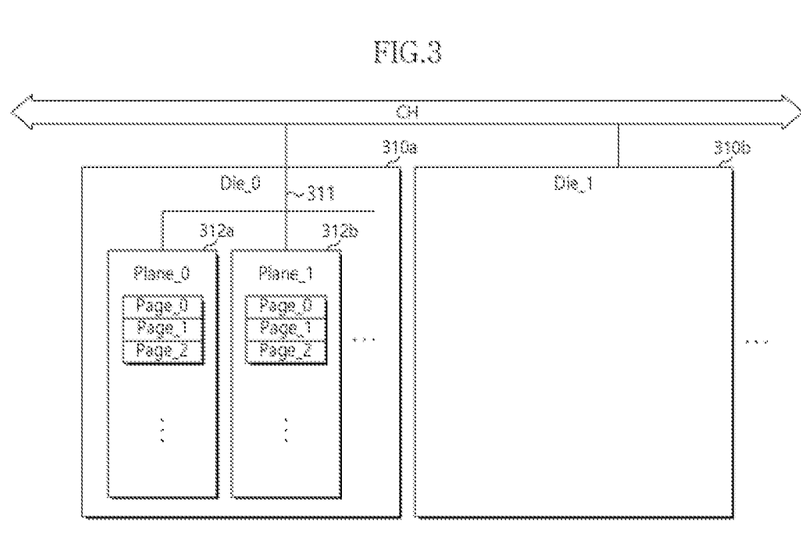
FIG. 3 is a diagram for describing a data storage region in accordance with an embodiment.

FIG. 3 is a diagram for describing a data storage region included in a nonvolatile memory device in accordance with an embodiment.

Referring to FIG. 3, the nonvolatile memory device 100 may include a plurality of dies 310a and 310b which share a channel CH coupled to the controller 200, each of the dies may include a plurality of planes 312a and 312b which share a way 311 coupled to the channel CH, and each of the planes may include a plurality of pages. The page may indicate a storage region corresponding to the minimum unit of an operation of reading or writing data. Furthermore, a plurality of pages which are collectively erased may be referred to as a block, and a plurality of blocks which are managed as one super block may be referred to as a super block. Therefore, the data storage region in the nonvolatile memory device may indicate a die, plane, super block, block, page or the like. In the following descriptions, however, the data storage region may indicate a page unless referred to the contrary.

Figure 4:
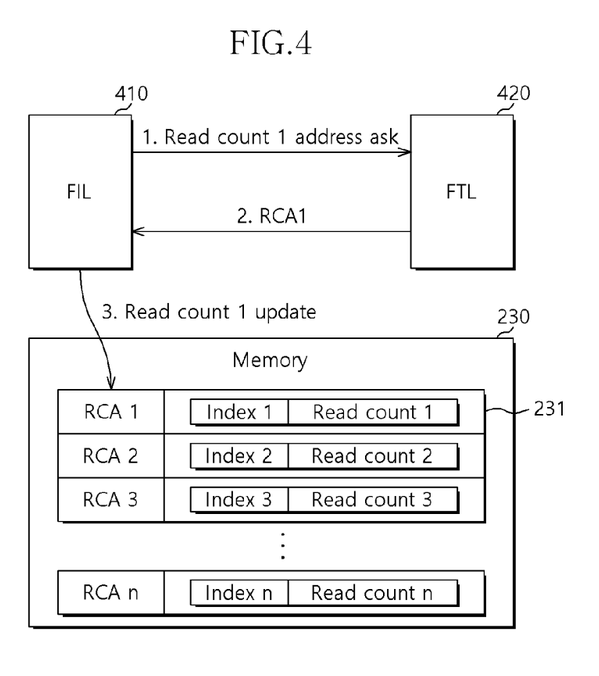
FIG. 4 is a diagram for describing an operation of a data storage device in accordance with an embodiment.

FIG. 4 is a diagram for describing an operation of the data storage device 10 in accordance with an embodiment.

Referring to FIG. 4, the FIL 410, which is executed by the memory interface 240 of the controller 200 shown in the embodiment of FIG. 1, may request a read count address RCA. Specifically, when a read operation of reading data stored in a first data storage region among the plurality of data storage regions included in the nonvolatile memory device 100 is performed, the FIL 410 may request a read count address RCA (hereafter, referred to as 'first read count address') to the FTL 420, which is executed by the processor 220 of the controller 200 shown in FIG. 1. The read count address RCA may indicate a location of a memory region 231, in which read count data (hereafter, 'first read count data') including a read count for the first data storage region where the read operation has been performed is stored. The memory region 231 may be included in the memory 230.

In an embodiment, the read count data may indicate a read count for each of the plurality of data storage regions included in the nonvolatile memory device 100. For example, the read count data may indicate read counts respectively for the pages within the nonvolatile memory device 100. The read count data may further include an index indicating an address of the data storage region. For example, the index may indicate addresses respectively for the pages within the nonvolatile memory device 100.

In an embodiment, the plurality of read count data may form a read count table. The read count table may be managed by the FTL 420.

In an embodiment, the read count table may be stored in the memory region 231 of the memory 230. For example, the controller 200 may receive the read count data from the nonvolatile memory device 100, and cache and store the received read count data in the memory 230.

In an embodiment, the FIL 410 may transfer a request to the FTL 420, the request including the index (i.e., the address) of the data storage region (i.e., a page) where a read operation has been performed. Once the read operation is performed on a target page, the FIL 410 may identify the address of the target page and thus the FIL 410 may provide the FTL 420 with the request including the address of the target page as the index.

The FTL 420 may transfer the read count address RCA to the FIL 410. Specifically, when a read count address request is received from the FIL 410, the FTL 420 may refer to the read count address table within the memory region 231, and transfer the first read count address RCA corresponding to the request of the FIL 410 to the FIL 410.

In an embodiment, the read count address table may include a read count address RCA indicating a location of the memory region 231 in which a corresponding read count data are stored.

In an embodiment, the read count address RCA may be mapped to the index (i.e., the address) of a data storage region (e.g., a page within the nonvolatile memory device 100) and the read count of the data storage region. For example, the FTL 420 may query a read count address RCA corresponding to the index of a data storage region according to the request of the FIL 410, and transfer the queried read count address RCA to the FIL 410.

The FIL 410 may update a read count of a data storage region corresponding to the read count address request provided to the FTL 420. Specifically, the FIL 410 may receive a read count address RCA from the FTL 420 as a response to the read count address request provided to the FTL 420. The FIL 410 may access the memory region 231 in which the read count data are stored, based on the received read count address RCA. At this time, the FIL 410 may update the read count included in the read count data stored in the accessed memory region 231. That is, the FIL 410 may update the read count of the data storage region (e.g., the target page) where the read operation has been performed, based on the read count address RCA of the memory region 231.

As described above, the read count data is managed by the FTL 420. According to a related art, when the FIL 410 accesses the read count data with reference to variables instead of the read count address RCA of the memory region 231, the independence between the FTL 420 and the FIL 410 may be damaged.

In accordance with an embodiment of the present disclosure, the FIL 410 may access the read count data only by referring to the read count address RCA of the memory region 231 in order to secure the independence between the FTL 420 and the FIL 410. For example, only when a read count address RCA1 is received from the FTL 420, the FIL 410 may update a read count Read count 1 based on the read count address RCA1.

Figure 5:
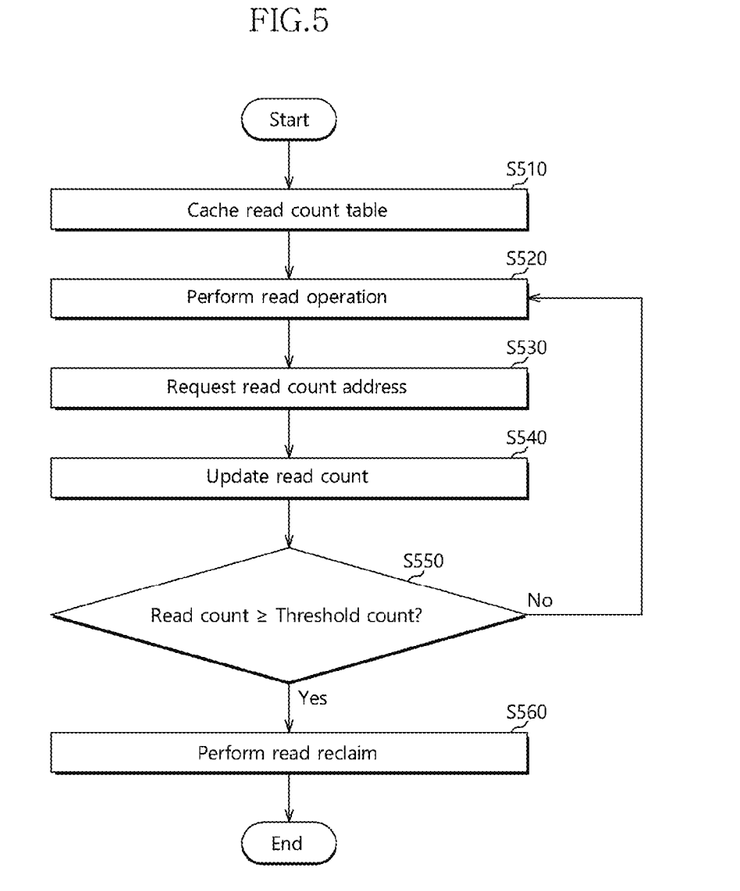
FIG. 5 is a flowchart for describing an operation of a data storage device in accordance with an embodiment.

FIG. 5 is a flowchart illustrating an operating method of the data storage device 10 in accordance with an embodiment.

Referring to FIG. 5, the processor 220 may load the read count table, which is described with reference to FIG. 4, from the nonvolatile memory device 100 into the memory 230 at step S510.

At step S520, a read operation may be performed. Specifically, the data storage device 10 may perform a read operation on one or more of a plurality of data storage regions (e.g., pages) included in the nonvolatile memory device 100. At this time, the nonvolatile memory device 100 may inform the FIL 410 of information on whether the read operation has been performed, the information including the index (i.e., an address) of the data storage region (e.g., a read-target page) where the read operation has been performed.

At step S530, a read count address may be requested. The FIL 410 may check whether the read operation has been performed on the data storage region. When it is checked that the read operation has been performed on the data storage region, the FIL 410 may request a read count address RCA from the FTL 420, the read count address RCA indicating an address of the memory region 231, in which the read count table is loaded. The read count address request may include the index (i.e., an address) of the data storage region (e.g., a read-target page). At this time, the FTL 420 may transfer the read count address RCA requested from the FIL 410 to the FIL 410 by referring to the read count address table and the index of the data storage region included in the read count address request.

At step S540, a read count may be updated. Specifically, the FIL 410 may receive the read count address RCA from the FTL 420. The FIL 410 may access the memory region 231 in which the read count data are stored, based on the received read count address RCA. The FIL 410 may update the read count corresponding to the received read count address RCA within the read count address table in the accessed memory region 231.

At step S550, the read count may be monitored. Specifically, the FTL 420 may monitor whether there is read count data having a read count value equal to or more than a preset threshold count, among the read count data included in the read count table. At this time, the FTL 420 may decide whether to perform a read reclaim operation on a data storage region having a read count value equal to or more than the threshold count.

In an embodiment, the FTL 420 may perform step S520 again, when the read count value is less than the threshold count (that is, "No" at step S550).

At step S560, the read reclaim operation may be performed, when the read count value is greater than or equal to the threshold count (that is, "Yes" at step S550). Specifically, the FTL 420 may control the nonvolatile memory device 100 to perform the read reclaim operation on the data storage region having a read count value equal to or more than the threshold count.

In accordance with the present embodiment, the data storage device can maintain the independence between the FTL and the FIL.

While various embodiments have been described above, it will be understood to those skilled in the art that the embodiments described are examples only. Accordingly, the operating method of the data storage device described herein should not be limited based on the described embodiments.

Figure 6:
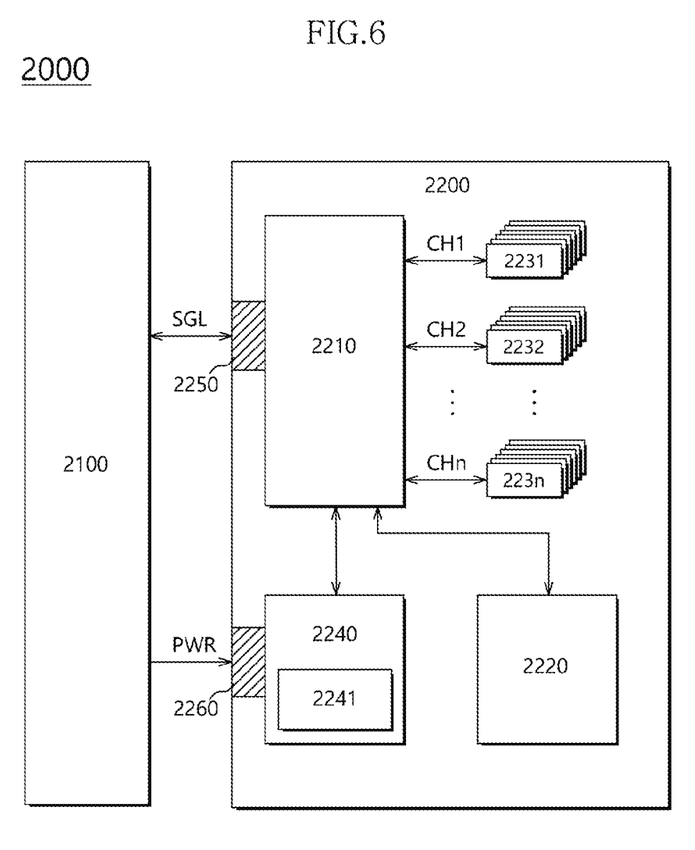
FIG. 6 illustrates a data processing system including a solid state drive (SSD) in accordance with an embodiment.
Figure 7:
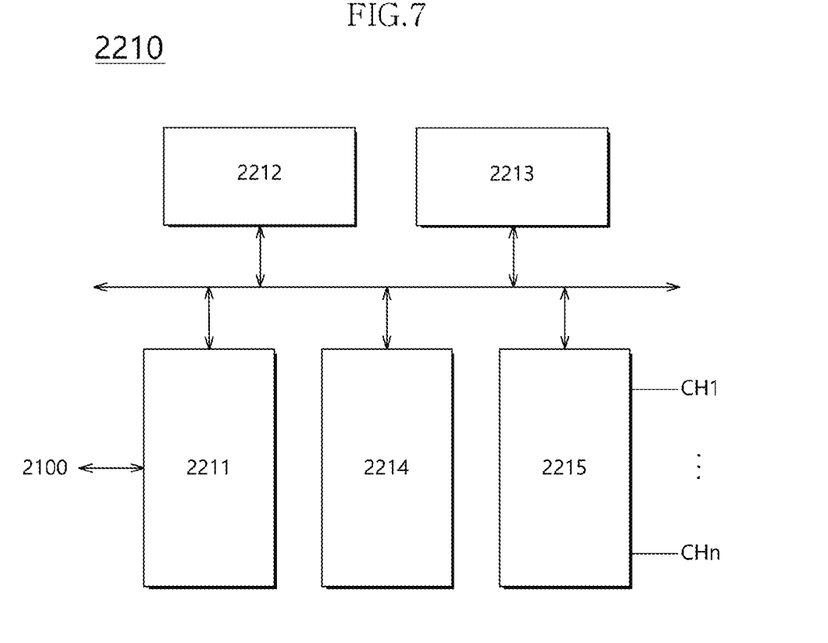
FIG. 7 illustrates a configuration of a controller of FIG. 6.

FIG. 6 and FIG. 7 are diagrams illustrating an example of a data processing system including a solid state drive (SSD) in accordance with an embodiment. Referring to FIG. 6, a data processing system 2000 may include a host device 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control general operations of the SSD 2200. Referring to FIG. 7, the controller 2210 may include a host interface 2211, a control component 2212, a random access memory 2213, an error correction code (ECC) component or circuit 2214, and a memory interface 2215.

The host interface 2211 may exchange a signal SGL with the host device 2100 through the signal connector 2250. The signal SGL may include a command, an address, data, and so forth. The host interface 2211 may interface the host device 2100 and the SSD 2200 according to the protocol of the host device 2100. For example, the host interface 2211 may communicate with the host device 2100 through any one of standard interface protocols such as secure digital, universal serial bus (USB), multimedia card (MMC), embedded MMC (eMMC), personal computer memory card international association (PCMCIA), parallel advanced technology attachment (PATH), serial advanced technology attachment (SATA), small computer system interface (SCSI), serial attached SCSI (SAS), peripheral component interconnection (PCI), PCI express (PCI-e or PCIe) and universal flash storage (UFS).

The control component 2212 may analyze and process a signal SGL inputted from the host device 2100. The control component 2212 may control operations of internal function blocks according to a firmware or a software for driving the SSD 2200. The random access memory 2213 may be used as a working memory for driving such a firmware or software.

The error correction code (ECC) component or circuit 2214 may generate the parity data of data to be transmitted to the nonvolatile memory devices 2231 to 223n. The generated parity data may be stored together with the data in the nonvolatile memory devices 2231 to 223n. The error correction code (ECC) component 2214 may detect an error of the data read out from the nonvolatile memory devices 2231 to 223n, based on the parity data. If a detected error is within a correctable range, the error correction code (ECC) component 2214 may correct the detected error.

The memory interface 2215 may provide control signals such as commands and addresses to the nonvolatile memory devices 2231 to 223n, according to control of the control component 2212. Moreover, the memory interface 2215 may exchange data with the nonvolatile memory devices 2231 to 223n, according to control of the control component 2212. For example, the memory interface 2215 may provide the data stored in the buffer memory device 2220, to the nonvolatile memory devices 2231 to 223n, or provide the data read out from the nonvolatile memory devices 2231 to 223n, to the buffer memory device 2220.

The buffer memory device 2220 may temporarily store data to be stored in the nonvolatile memory devices 2231 to 223n. Further, the buffer memory device 2220 may temporarily store the data read out from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to each channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include large capacity capacitors.

The signal connector 2250 may be configured by various types of connectors depending on an interface scheme between the host device 2100 and the SSD 2200.

The power connector 2260 may be configured by various types of connectors depending on a power supply scheme of the host device 2100.

Figure 8:
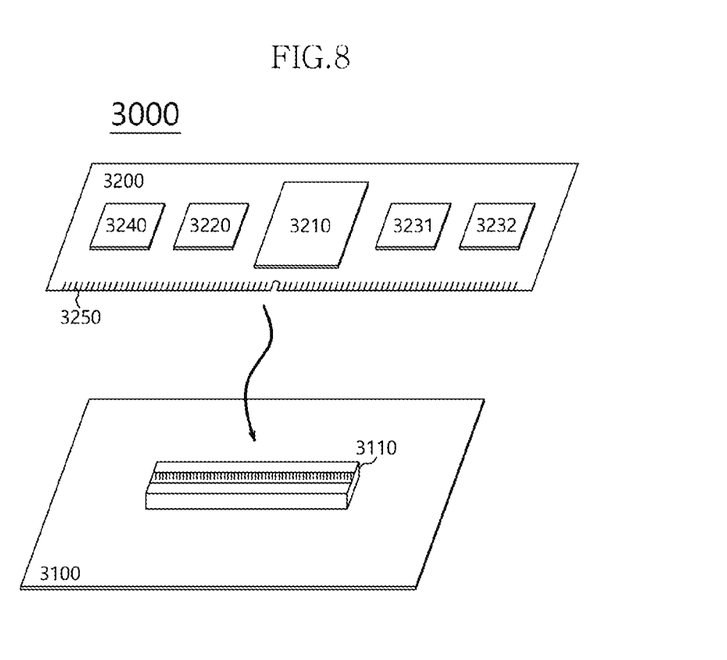
FIG. 8 illustrates a data processing system including a data storage device in accordance with an embodiment.

FIG. 8 is a diagram illustrating an example of a data processing system including a memory system in accordance with an embodiment. Referring to FIG. 8, a data processing system 3000 may include a host device 3100 and a memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 2210 shown in FIG. 6.

The buffer memory device 3220 may temporarily store data to be stored in the nonvolatile memory devices 3231 and 3232. Further, the buffer memory device 3220 may temporarily store the data read out from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and so forth and power may be transferred between the host device 3100 and the memory system 3200. The connection terminal 3250 may be configured into various types depending on an interface scheme between the host device 3100 and the memory system 3200. The connection terminal 3250 may be disposed on any one side of the memory system 3200.

Figure 9:
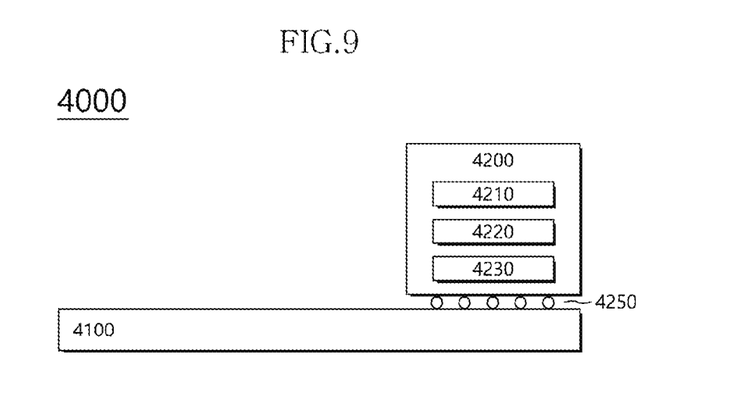
FIG. 9 illustrates a data processing system including a data storage device in accordance with an embodiment.

FIG. 9 is a diagram illustrating an example of a data processing system including a memory system in accordance with an embodiment. Referring to FIG. 9, a data processing system 4000 may include a host device 4100 and a memory system 4200.

The host device 4100 may be configured in the form of a board such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 2210 shown in FIG. 6.

The buffer memory device 4220 may temporarily store data to be stored in the nonvolatile memory device 4230. Further, the buffer memory device 4220 may temporarily store the data read out from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as a storage medium of the memory system 4200.

Figure 10:
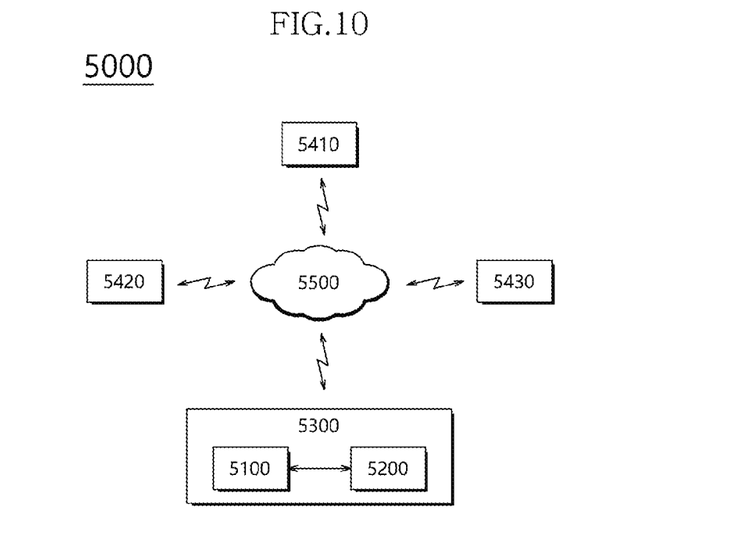
FIG. 10 illustrates a network system including a data storage device in accordance with an embodiment.

FIG. 10 is a diagram illustrating an example of a network system including a memory system in accordance with an embodiment. Referring to FIG. 10, a network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and a memory system 5200. The memory system 5200 may be constructed by memory system 100 shown in FIG. 1, the SSD 2200 shown in FIG. 6, the memory system 3200 shown in FIG. 8 or the memory system 4200 shown in FIG. 9.

Figure 11:
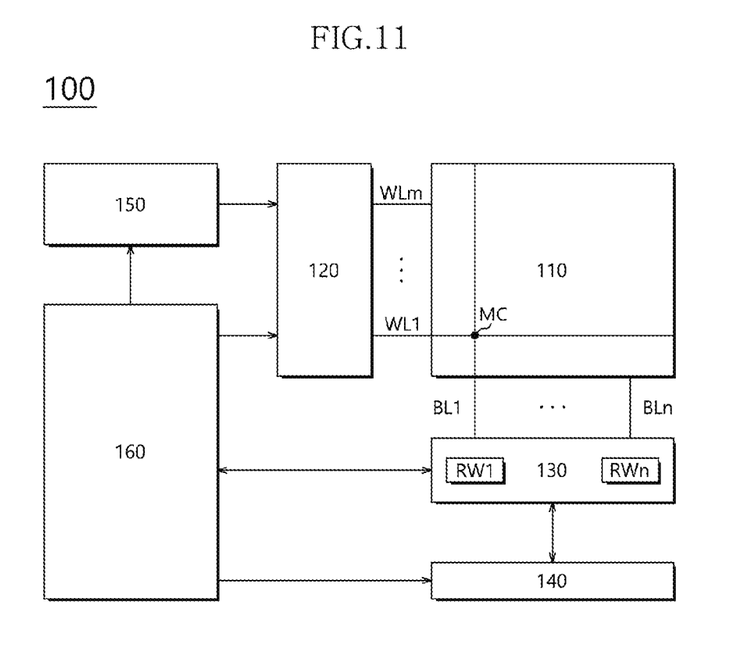
FIG. 11 is a block diagram illustrating a nonvolatile memory device included in a data storage device in accordance with an embodiment.

FIG. 11 is a block diagram illustrating an example of a nonvolatile memory device included in a memory system in accordance with an embodiment. Referring to FIG. 11, a nonvolatile memory device 100 may include a memory cell array 110, a row decoder 120, a data read/write block 130, a column decoder 140, a voltage generator 150, and a control logic 160.

The memory cell array 110 may include memory cells MC which are arranged at areas where word lines WL1 to WLm and bit lines BL1 to BLn intersect with each other.

The row decoder 6200 may be coupled with the memory cell array 110 through the word lines WL1 to WLm. The row decoder 120 may operate according to the control of the control logic 160. The row decoder 120 may decode an address provided from an external device (not shown). The row decoder 120 may select and drive the word lines WL1 to WLm, based on a decoding result. For instance, the row decoder 120 may provide a word line voltage provided from the voltage generator 150, to the word lines WL1 to WLm.

The data read/write block 130 may be coupled with the memory cell array 110 through the bit lines BL1 to BLn. The data read/write block 130 may include read/write circuits RW1 to RWn respectively corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as a write driver which stores data provided from the external device, in the memory cell array 110 in a write operation. For another example, the data read/write block 130 may operate as a sense amplifier which reads out data from the memory cell array 110 in a read operation.

The column decoder 140 may operate according to the control of the control logic 160. The column decoder 6400 may decode an address provided from the external device. The column decoder 140 may couple the read/write circuits RW1 to RWn of the data read/write block 130 respectively corresponding to the bit lines BL1 to BLn with data input/output lines (or data input/output buffers), based on a decoding result.

The voltage generator 150 may generate voltages to be used in internal operations of the nonvolatile memory device 100. The voltages generated by the voltage generator 150 may be applied to the memory cells of the memory cell array 110. For example, a program voltage generated in a program operation may be applied to a word line of memory cells for which the program operation is to be performed. For still another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 160 may control general operations of the nonvolatile memory device 100, based on control signals provided from the external device. For example, the control logic 6600 may control the read, write and erase operations of the nonvolatile memory device 100.

What is claimed is:

1. A controller for controlling a nonvolatile memory device, comprising:
   a read count table including a plurality of read count data, wherein each of the read count data includes a read count value for a data storage region;
   a read count address table including a read count address indicating an address of a memory region where the read count data is stored;
   a flash translation layer (FTL) configured to control an operation of the nonvolatile memory device, and manage the read count table and the read count address table; and
   a flash interface layer (FIL) configured to control data communication between the FTL and the nonvolatile memory device, and update the read count value based on the read count address when read operation is performed on a first data storage region,
   wherein the FIL requests the read count address of the read count data for the first data storage region to the FTL, and updates the read count value included in the read count data based on the read count address provided from the FTL.

2. The controller according to claim 1, wherein the FTL transfers the read count address to the FIL in response to the request for the read count address from the FIL.

3. The controller according to claim 1, further comprising:
   a memory configured to store one or more of the read count table, the read count address table, the FTL and the FIL;
   a processor configured to execute the FTL; and
   a memory interface configured to execute the FIL.

4. The controller according to claim 1, wherein the data storage region is any one of a data page, a memory block, a plane and a die.

5. The controller according to claim 1, wherein the read count data comprises the read count value and an address of the data storage region corresponding to the read count value.

6. The controller according to claim 1, wherein the FTL controls the nonvolatile memory device to perform a read reclaim operation on the data storage region corresponding to the read count data when the read count value is equal to or more than a threshold count.

7. An operating method of a controller which includes a flash translation layer (FTL) and a flash interface layer (FIL) to control an operation of a nonvolatile memory device, the operating method comprising:
   requesting, by the FIL, a read count address to the FTL, the read count address indicating an address of a memory region in which read count data including a read count value of a first data storage region on which a read operation has been performed, among a plurality of data storage regions included in the nonvolatile memory device, is stored;
   transferring, by the FTL, the read count address to the FIL according to the request of the FIL; and
   updating, by the FIL, the read count value of the first data storage region based on the read count address received from the FTL.

8. The operating method according to claim 7, further comprising checking, by the FIL, whether a read operation is performed on the first data storage region.

9. The operating method according to claim 7, wherein the transferring the read count address to the FIL includes referring, by the FTL, to a read count address table of a plurality of read count data corresponding to the plurality of data storage regions, and transferring the read count address to the FIL in response to the request for the read count address.

10. The operating method according to claim 7, wherein the data storage region is any one of a data page, a memory block, a plane and a die.

11. The operating method according to claim 7, wherein the read count data comprises the read count value and an address of the data storage region corresponding to the read count value.

12. The operating method according to claim 7, further comprising controlling, by the FTL, the nonvolatile memory device to perform a read reclaim operation on the data storage region corresponding to the read count data when the read count value is equal to or more than a threshold count.

13. A memory system comprising:
   a memory device configured to perform a read operation on a read-target region;
   a memory configured to load a read count table having fields of a read count address, an address of the read-target region and a read count of the read-target region;
   an interface configured to provide a request including information of the address of the read-target region; and
   a control logic configured to provide, in response to the request, the interface with information of the read count address corresponding to the information of the address of the read-target region,
   wherein the interface updates information of the read count of the read-target region corresponding to the information of the read count address, and
   wherein the control logic controls the memory device to perform a read reclaim operation to the read-target region according to the information of the read count of the read-target region.

* * * * *